United States Patent [19]
Collet et al.

[11] Patent Number: 5,182,869
[45] Date of Patent: Feb. 2, 1993

[54] APPARATUS FOR COOLING SPENT ANODES OF ELECTROLYTIC MELTING BATHS

[75] Inventors: Erwin Collet, Lunen; Roland Rathgeber, Neub; Udo Jerxsen, Toging, all of Fed. Rep. of Germany

[73] Assignee: Westfalia Becorit Industrietechnik GmbH, Lunen, Fed. Rep. of Germany

[21] Appl. No.: 780,196

[22] Filed: Oct. 22, 1991

[30] Foreign Application Priority Data

Oct. 24, 1990 [DE] Fed. Rep. of Germany ....... 4033713

[51] Int. Cl.$^5$ .............................................. F26B 7/00
[52] U.S. Cl. ........................................ 34/20; 34/218
[58] Field of Search .................. 34/20, 22, 29, 34, 12, 34/218, 210, 219, 225, 208

[56] References Cited

U.S. PATENT DOCUMENTS 3,726,020 4/1973 Lee, Jr. ................................... 34/21
4,414,758 11/1983 Peter et al. .............................. 34/20

Primary Examiner—Henry A. Bennet
Attorney, Agent, or Firm—Sughrue, Mion, Zinn, Macpeak and Seas

[57] ABSTRACT

For the purpose of cooling anode rods carrying hot spent anodes removed from electrolytic furnaces, a separate cooling chamber is provided through which the anode rods to be cooled are conveyed by means of a through conveyor, preferably on pallets. The cooling chamber possesses, in its bottom region, a cooling air feed and, in its top region, a waste air extraction duct. At both ends, the cooling chamber is closable by means of doors.

25 Claims, 5 Drawing Sheets

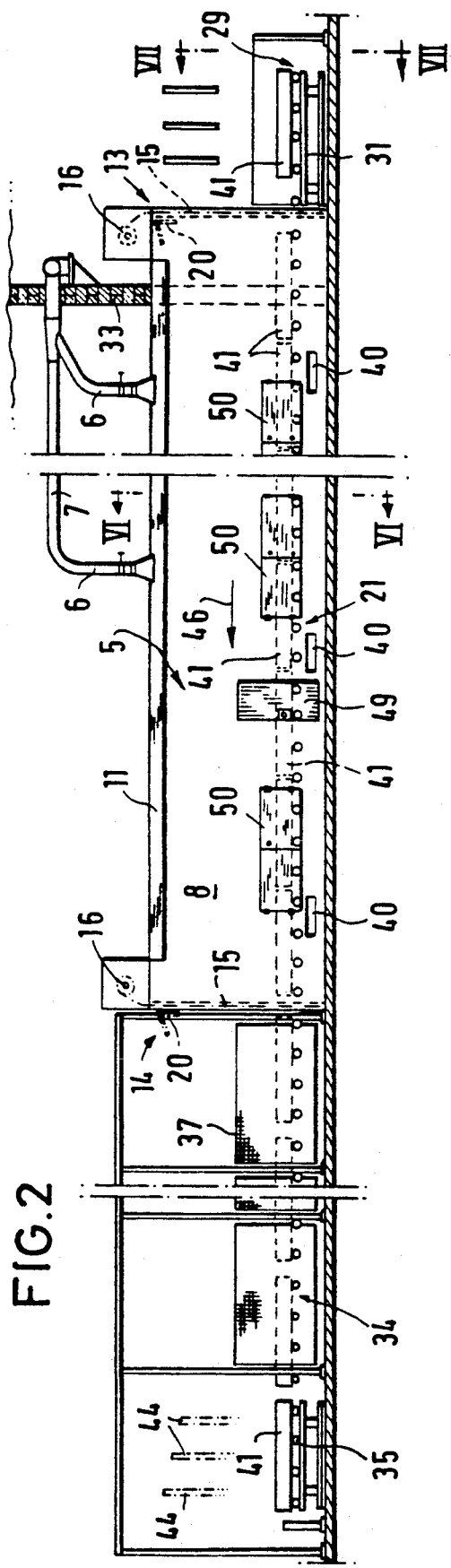
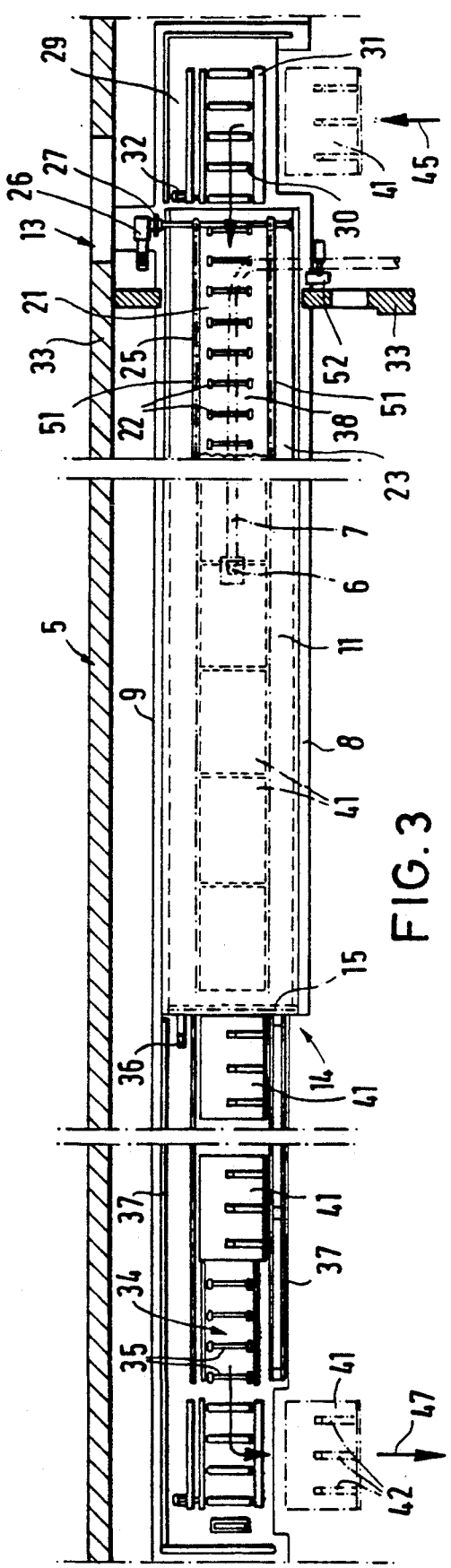
FIG.2
FIG.3

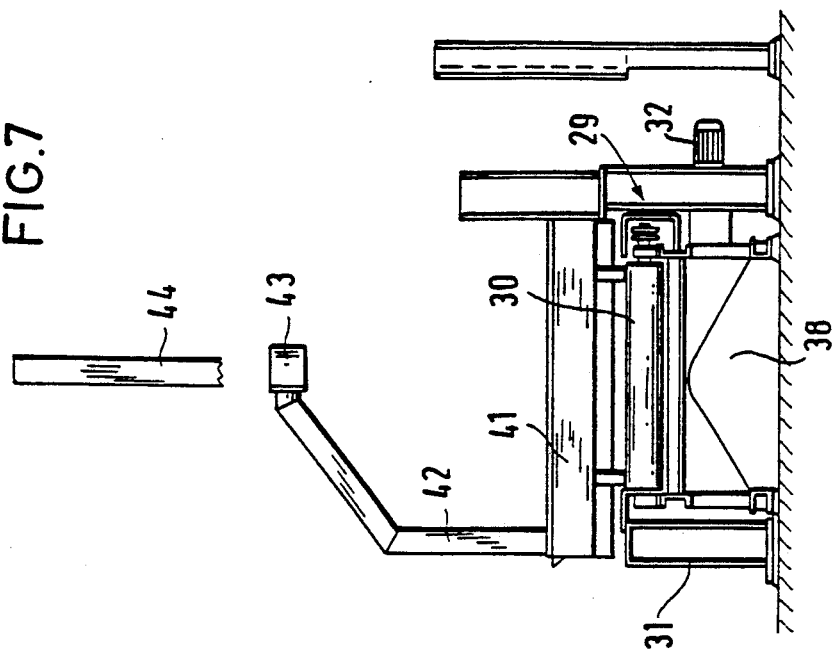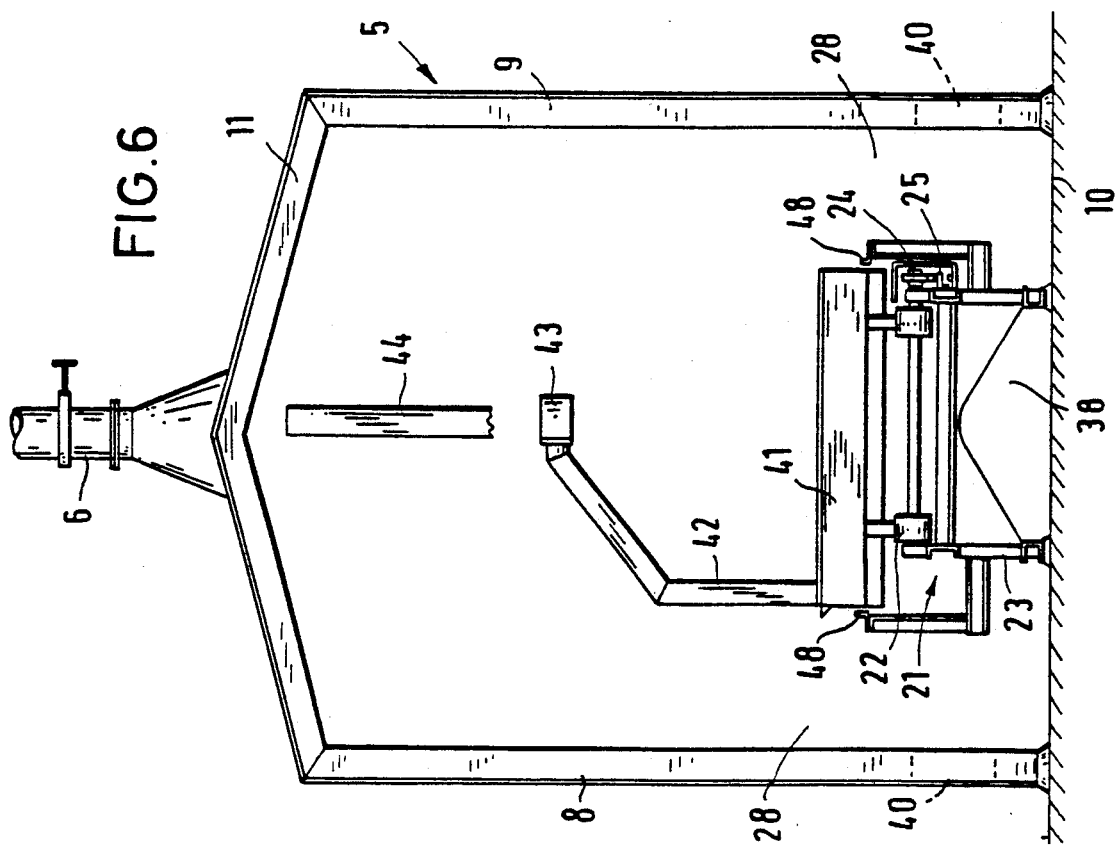

APPARATUS FOR COOLING SPENT ANODES OF ELECTROLYTIC MELTING BATHS

FIELD OF THE INVENTION

This invention relates to an apparatus for cooling anode rod assemblies, i.e. spent or residual anodes mounted on anode rods, which are removed from electrolytic furnaces.

BACKGROUND TO THE INVENTION

It is known that, in operation of electrolytic melting baths for aluminium production, the burnt-out or spent carbon anodes, which are present as residual anodes on the anode rods, must be removed from the furnaces and replaced by new anodes from time-to-time. The hot anode rods together with the hot residual anodes must be cooled before the residual anodes can be stripped off the nipples of the anode rods and these anode rods, possibly after reprocessing, can be fitted with new carbon anodes. In the past, the anode rods together with residual anodes removed from the melting furnaces have been cooled by being laid down in the furnace hall. Since the cooling operation is accompanied by considerable gas emission from the hot residual anodes, this leads to considerable air pollution and thus to harmful effects upon the personnel working in the furnace hall. Furthermore, long cooling times occur, so that the reprocessing of the anodes and anode rods can be carried out only with considerable delay.

An object of the present invention therefore is to provide an apparatus, by which the consumed anodes taken from the hot melting furnaces, as well as their anode rods, can be effectively cooled considerably more rapidly and without environmental pollution due to gas emissions in the furnace hall.

SUMMARY OF THE INVENTION

In accordance with the invention there is provided apparatus for cooling anode rod assemblies, composed of spent anodes mounted on anode rods, removed from electrolytic furnaces; said apparatus comprising a building structure defining an elongate cooling chamber, conveyor means for transporting the anode rod assemblies along the chamber and means for feeding cooling air into the chamber at least from a bottom region of the chamber and means at the top region of the chamber for extracting heating air together with any waste gases given off.

With the apparatus of this invention, accordingly, the hot anode rods with the very hot residual anodes, removed from the electrolytic melting baths, can be rapidly and effectively cooled in economical manner as they pass through the cooling chamber, where fresh cooling air is fed onto the anode rod assemblies. The cooling air flows through the cooling chamber continuously while the anode rod assemblies progress along the chamber utilizing the heat gradient. The air is continuously sucked out of the cooling chamber as waste air together with any waste gas emitted from the spent anodes. It is possible for waste extracted air to be subjected to filtering and cleaning. Advantageously, the possibility is also available of connecting the air extraction means from the cooling chamber with the extraction system of the furnace hall, so that the waste air from the cooling chamber is conducted away through the waste air duct of the furnace hall. Depending upon the length of the cooling range of the cooling chamber, a small or fairly large number of residual anodes together with anode rods can be subjected to the cooling operation in this chamber simultaneously in a continuous through process. The cooling range is advantageously so designed that the entire replacement inventory of a furnace hall, in which several electrolytic melting furnaces may indeed be present, can be subjected to the cooling operation. This means that the throughput through the cooling chamber can be adapted to the charge time of the carbon anodes.

The cooling air feed advantageously comprises a ventilation duct passing along through the cooling chamber, which is provided with outlet openings for the cooling air or fresh air, distributed along its length. Preferably, the ventilation duct is disposed underneath the conveyor means and is advantageously provided with upwardly orientated pipes or the like, forming the fresh air outlet openings. It is, also recommended to provide fresh air feed openings distributed along the side walls of the cooling chamber. These fresh air feed openings are advantageously adjustable in their cross-section.

In a preferred embodiment, the cooling chamber of this invention comprises both the aforementioned ventilation duct and also the fresh air feed openings arranged in its lateral walls. The ventilation duct is favourably connected, outside the cooling chamber, with the external atmosphere, so that the fresh air can be sucked in and fed through the ventilation duct. It is therefore recommended that the ventilation duct be so designed that it leads out of the cooling chamber both at the inlet and at the outlet ends, and is in communication there with the external air for the sucking in of fresh air. Accordingly, in cooling operation, the fresh air can be sucked into the ventilation duct and thus into the cooling chamber from both ends, by which means an especially effective cooling can be achieved.

The conveyor means disposed in the cooling chamber can be of various forms of construction. It favourably will consist of a conveying track for pallets, which carry the anode rod assemblies. The anode rods together with the hot spent anodes are, in this case, conveyed by the help of conveying pallets through the cooling chamber. Preferably, the main conveyor consists of a roller conveyor forming a conveying track for the pallets and having driven conveying rollers, although other types of conveying devices, could be used for this purpose. The support structure for the roller conveyor is preferably provided with upstanding walls or the like forming lateral guides for the conveying pallets so that the pallets as they pass through the cooling chamber remain aligned on the roller track.

The aforementioned ventilation duct is advantageously disposed beneath the conveying rollers of the roller track, the fresh air outlet openings and pipes being generally directed onto the bearings of the conveyor rollers, so that an effective cooling of these components of the through conveyor is also achieved. The conveying pallets preferably have upstanding anode rod holders, which are provided with preferably claw-like holding elements for holding the upright anode rods, so that the anode rods are held in a vertical position on the conveying pallets.

In a further advantageous embodiment of the invention, the cooling chamber is closable at its inlet and also at its outlet, by a door preferably a vertically movable roller shutter door with an associated drive. It is also to be recommended to provide, at the cooling chamber inlet behind the door a pivoting flap which can be swung upwards when hit by the anode rod. A corresponding pivoting flap may also be provided behind the door at the outlet end. These pivoting flaps prevent hot gases from escaping out of the chamber when the doors are opened. For the same purpose, it is to be recommended that the inlet cross-section and/or outlet cross-section of the cooling chamber shall be narrowed down to approximately the passage cross-section for the anode rod assemblies or the conveying pallets carrying the anode rods by a fixed bulkhead wall disposed behind or before the door.

In order to achieve high cooling air flow speeds in the chamber, its cross-section is designed comparatively slender. It is, however, to be recommended that a narrow access footway be provided in the cooling chamber on each side of the main conveyor.

In a further advantageous development of the invention, there is disposed at the inlet to the cooling chamber a feed conveyor, which feeds the anode rod assembly to be cooled into the cooling chamber when the door is open. Preferably, this feed conveyor consists of a roller track section mounted at the same level as the conveyor in the cooling chamber. The conveying pallets equipped with the anode rod assemblies to be cooled can be set down on the feed conveyor for example by means of a front stacking truck i.e. a fork lift truck or the like. Furthermore, a pallet conveying track is favourably provided at the outlet end of the cooling chamber. This outlet track can also consist of a roller conveyor and forms a buffer zone for several pallets. The pallets, together with the cooled anode rods and spent anodes, can be removed by means of a fork lift truck from the outlet conveyor track.

In order to reduce heat radiation outwards, the inner walls or surfaces of the cooling chamber are advantageously provided with heat radiation protective sheets or the like.

It is advantageous to locate the cooling chamber in the vicinity of the closed furnace hall but in the open air. In this case the feed conveyor can be situated inside the furnace hall, so that the hot anode rods together with spent anodes removed from the melting baths can be taken up in the furnace hall onto the feed conveyor for transportation through the cooling chamber.

The invention may be understood more readily, and various other aspects and features of the invention may become apparent, from consideration of the following description.

BRIEF DESCRIPTION OF DRAWINGS

An embodiment of the invention will now be described, by way of example only, with reference to the accompanying drawings, wherein:

FIG. 2 depicts the cooling apparatus shown in FIG. 1 in a lateral elevation;

FIG. 3 depicts the cooling apparatus shown in FIG. 1 in a plan view, partly in section;

FIG. 6 is a section taken on the line VI—VI of FIG. 2; and

FIG. 7 is a view taken in the direction of the arrows VII—VII of FIG. 2.

DESCRIPTION OF PREFERRED EMBODIMENT

OVERALL INSTALLATION

Figure 1:
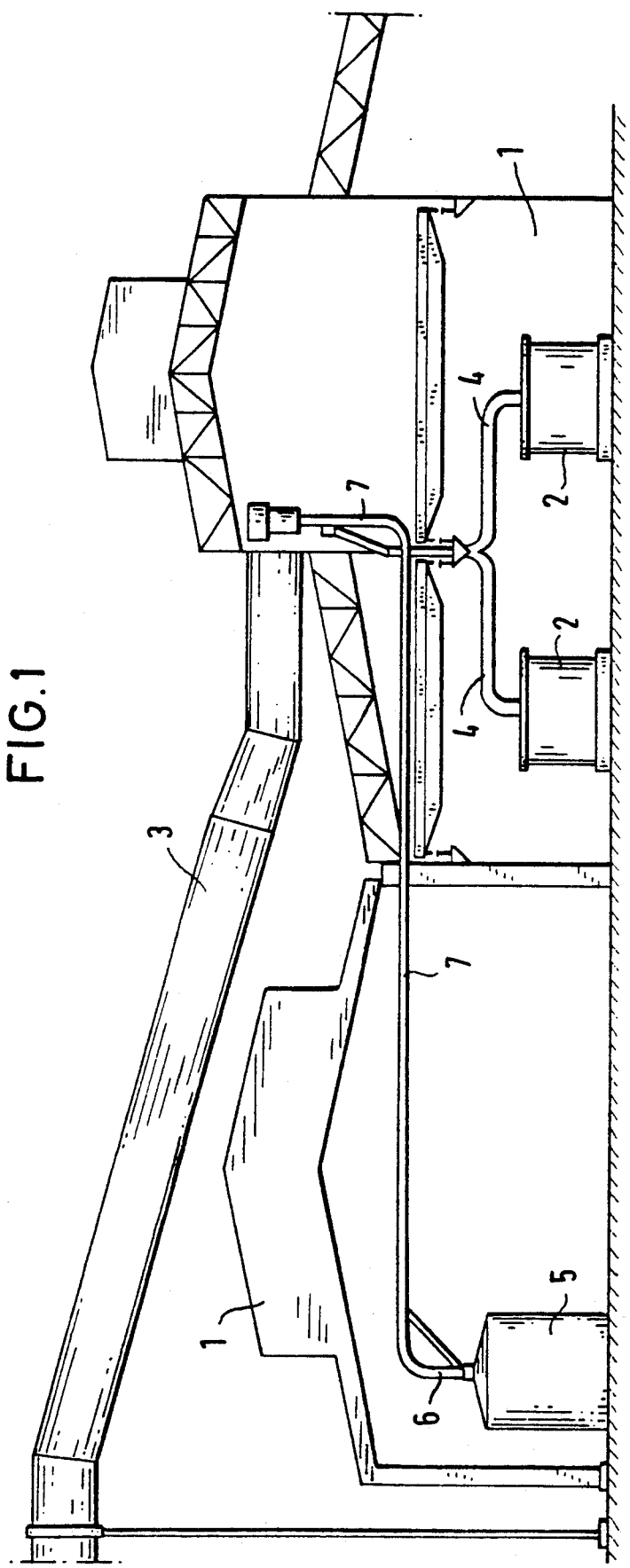
FIG. 1 is a schematic simplified view of an installation containing a plurality of electrolytic melting furnaces in a furnace hall and cooling apparatus disposed outside the hall together with the associated system for extraction of waste air from the furnace hall and from the cooling apparatus.

In FIG. 1, a furnace hall 1 is shown, which contains a plurality of melting furnaces 2 for the electrolytic production of aluminium. In known manner, a waste air extraction system is provided for drawing off the gases given off during operation of the furnaces. This extraction system comprises a waste air duct 3 of sufficiently large cross-section, to which the melting furnaces 2 are connected by individual extraction pipes or lines 4. Laterally of the furnace hall 1, there is a building structure defining separate cooling chamber 5 which is disposed on open-air ground. The cooling chamber 5 serves to cool anode rod assemblies removed from the baths of the electrolytic furnaces 2 from time-to-time. The chamber 5 is provided in its top region with a waste air discharge pipe or line 6, which is connected via a waste air pipe or line 7 to the main waste air duct 3. Preferably, the cooling chamber has several waste air discharge pipes or lines 6, distributed along its length and connected to the common pipe or line 7 and thus to the waste air duct 3, as shown in FIG. 2. The elongate cooling chamber 5 has, for instance, a length of 25 to 40 m.

COOLING CHAMBER

Figure 4:
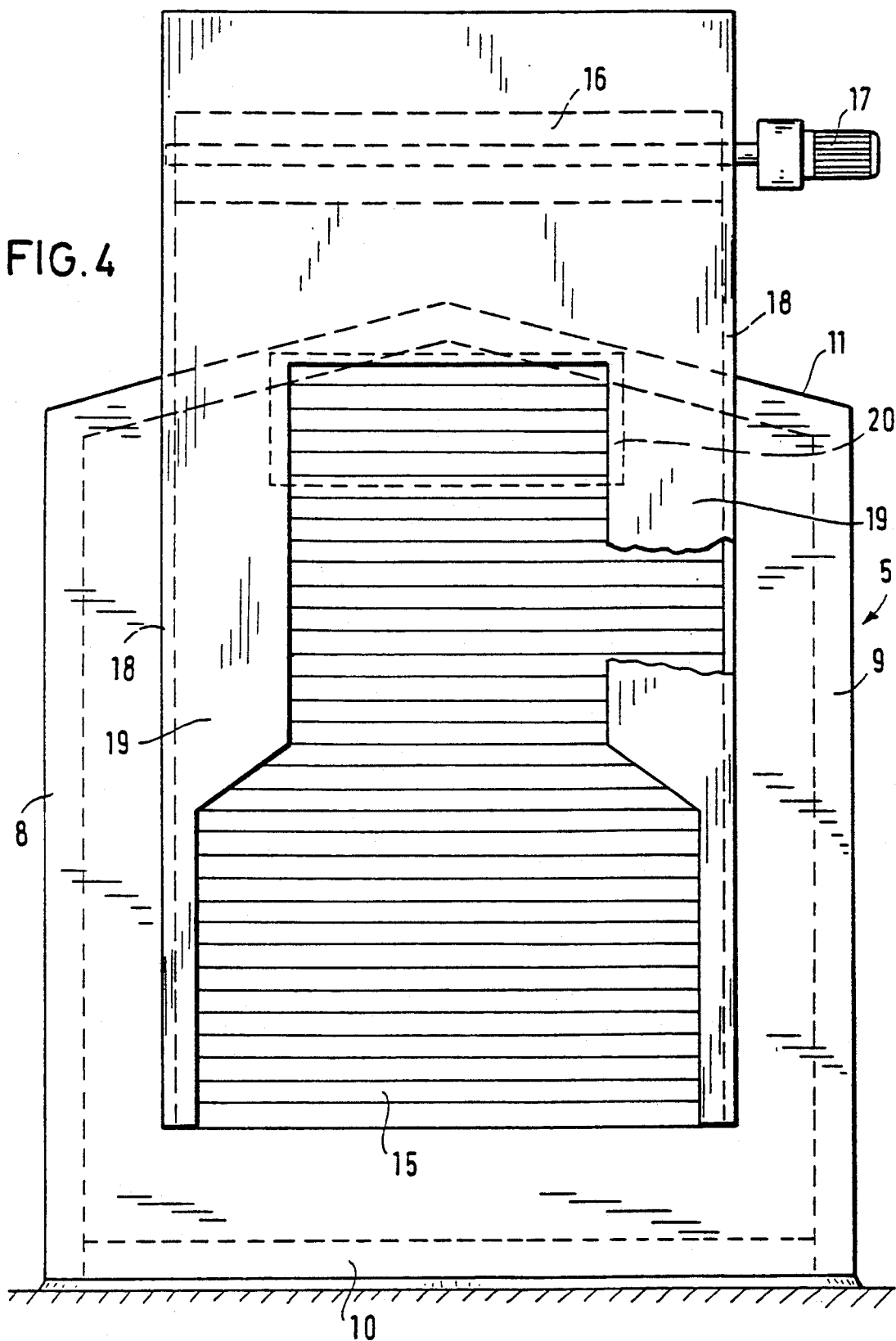
FIG. 4 is an end view of the cooling chamber inlet with a roller-shutter door mounted thereat.
Figure 5:
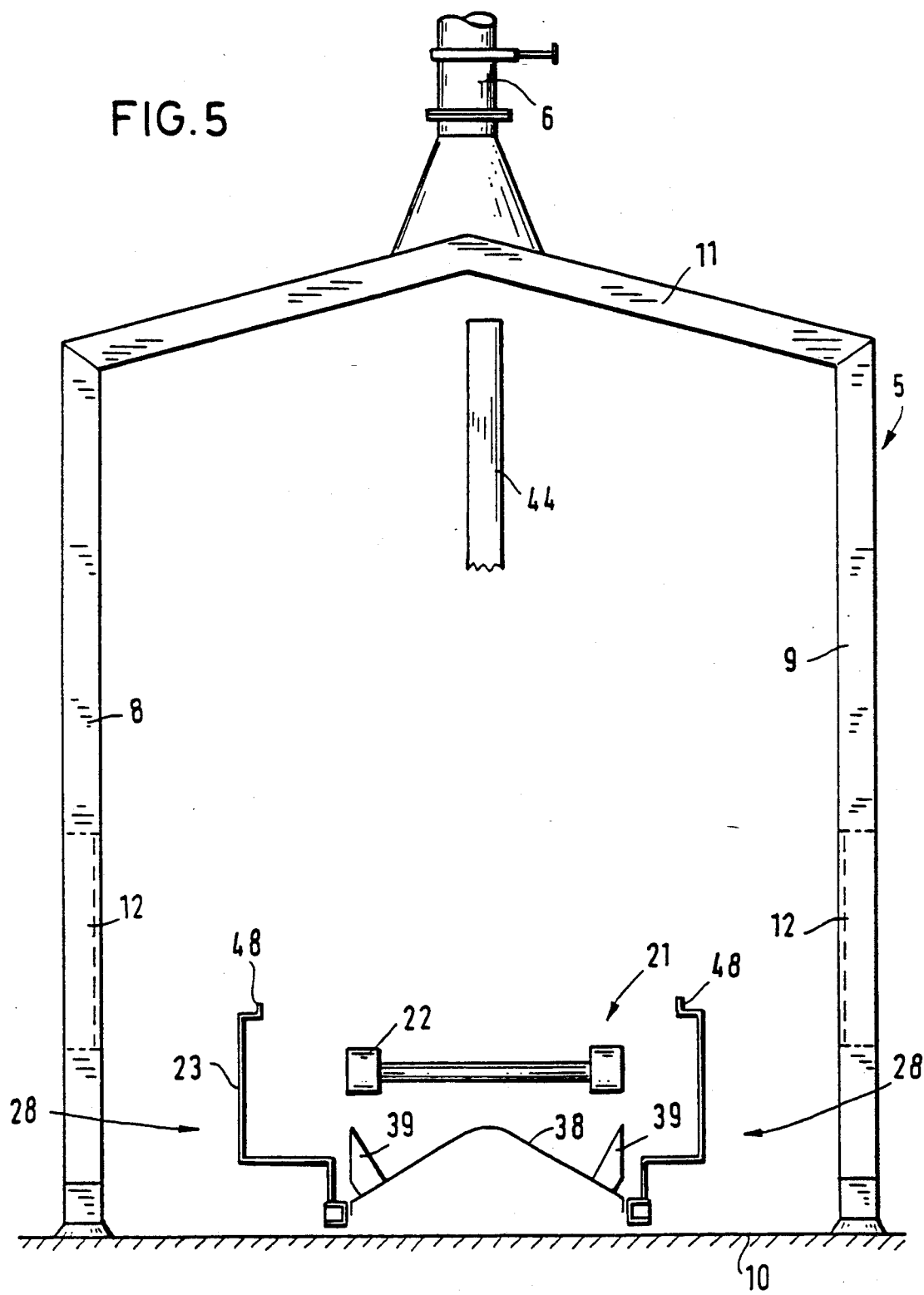
FIG. 5 is a vertical section through the cooling apparatus showing schematically a conveyor for transporting the anode rods.

The cooling chamber 5 has a cross-section shown in FIG. 5. The chamber 5 is defined by vertical side walls 8 and 9, which stand on a foundation 10 and are connected together by a pitched or saddle-like chamber roof 11. The inner walls of the cooling chamber 5 preferably consist, at least in partially of radiant heat protection plates 12 or are lined with such protection plates. Reference 13 denotes the cooling chamber inlet and 14 the cooling chamber outlet situated at the opposite end of the chamber 5. At the inlet 13 and at the outlet 14, the cooling chamber 5 is closable by means of a door 15. Each door 15 is, constructed as a roller-shutter door, as shown particularly in FIG. 4. The roller shutter doors 15 are vertically movable in lateral guides 18 FIG. 4 and can be wound onto a roller 16 at the top and wound off this roller 16 to close the chamber 5. Reference 17 denotes a drive for driving the roller 16. FIG. 4 also shows that, at the cooling chamber inlet 13 and also at the cooling chamber outlet 14, a fixed wall 19 is disposed behind the roller-shutter door 15. The walls 19 restrict the cross-section of the cooling chamber 5 laterally and also in height at the inlet and outlet to a passage cross-section which is just sufficiently large that, when the door 15 is opened, conveying pallets carrying the anode rod assemblies can enter and leave the cooling chamber without interfering with the chamber 5, and without unduly opening the chamber to allow waste gases from the hot spent anodes to escape while the doors 15 are open. The same purpose is served by pivoting flaps 20, disposed in the top region of the cooling chamber, as will be explained in more detail below.

Inside the cooling chamber 5 is a main conveyor 21, passing along this chamber 5 and extending from the cooling chamber inlet 13, through the entire cooling range, as far as the cooling chamber outlet 14. It is preferred for the conveyor 21 to be in the form of a roller conveyor, which constitutes a pallet conveying track and is provided with driven conveying rollers 22. These rollers 22 are journalled in a support structure 23, standing on the floor 10 of the cooling chamber as shown in FIGS. 6 and 7, and have sprocket wheels 24 on their roller axes, so that they can be driven by means of an endless driven chain 25. The drive chain 25 is driven, in the region of the cooling chamber inlet 13, by a geared motor 26 via a sprocket wheel 27. At the other end, that is in the region of the cooling chamber outlet 14, the chain 25 runs over a return wheel. By means of this chain drive, therefore, the conveyor rollers 22 are all driven together. FIGS. 3, 5 and 6 show that, on either side of the conveyor 21 located generally in the centre of the cooling chamber 5, a narrow access footway 28 is provided.

At the inlet 13 to the cooling chamber 5 and in front of it, a feed conveyor 29 is disposed, which consists of a roller track section comprising conveying rollers 30, disposed at the same level as the conveyor 21 and its roller track. The conveyor rollers 30 are journalled in a support frame 31 and are driven by a motor 32 via a chain drive. The roller track section has a sufficient length to allow a conveying pallet carrying anode assemblies to be placed on it from the side. As FIGS. 2 and 3 show, the cooling chamber 5 passes with its inlet end through a passage in a wall 33 of the furnace hall 1, so that the feed conveyor 29 is located inside the furnace hall 1 and therefore can be loaded with the pallets from this hall.

At the outlet 14, behind the cooling chamber 5, a pallet conveyor track 34 is provided as a continuation of the conveyor 21. The track 34 also consists of a roller conveyor, the conveying rollers 35 of which are driven by a geared motor 36 via a chain drive. The length of this roller conveyor is sufficiently large for it to be able to accept several conveying pallets, arranged closely spaced behind one another. The pallet conveying track 34 accordingly constitutes a buffer zone for several conveying pallets. For protection purposes, lateral grating plates 37 are advantageously provided in the otherwise open support of the pallet conveyor track.

The cooling chamber 5, operating with cooling air, is provided in its bottom region with a cooling air feed. This consists of a ventilation duct 38 passing longitudinally through the cooling chamber 5, and the cross-section of which is shown in FIGS. 5 to 7. The top surface of the ventilation duct 38 is constructed somewhat arched in the form of a roof. The ventilation duct 38 is situated underneath the conveyor 21. The duct 38 possesses a plurality of outlet openings for the fresh cooling air, distributed along its length, which are formed of obliquely upwardly orientated pipes 39. The pipes 39 are so disposed on both sides of the ventilation duct 38, that the fresh air emerges obliquely upwardly into the internal space of the cooling chamber and simultaneously cools the conveyor 21 and the bearings of its rollers 22 as well as the anode rod assemblies with the spent anodes carried by the through conveyor 21.

In addition a further cooling air feed comprises a plurality of openings or slots 40 (FIG. 2) distributed along the length of the cooling chamber 5 in the lower regions of its lateral walls 8 and 9. These openings 40 are advantageously adjustable in cross-section or, if need be, also closable by means of slide valves or the like, in order to enable the quantity of fresh air passed into the cooling chamber 5 to be varied.

The air duct 38, disposed in the bottom region of the cooling chamber 5, is conducted out of the chamber 5 at the inlet 13 and at the outlet 14 and is in communication here at both its ends with the external atmosphere, so that the cooling or fresh air can be drawn in from both ends.

OPERATION OF THE COOLING APPARATUS

The anode rods together with spent anodes removed from the melting furnaces 2 are set down on conveyor pallets 41, which are provided with upstanding anode rod holders 42, which have at their upper ends claw-like or fork-like holding elements 43 for the anode rods. In FIGS. 6 and 7, the upstanding anode rods are referenced 44. The spend anodes disposed at the lower ends of the anode rods 44 in conjunction with their nipples rest upon the conveying pallets 41. The holding elements 43 position and holding the anode rods while the rods together with spent anodes are supported on the conveying pallets 41. Preferably, the arrangement is such that on each conveying pallet 41 there are a plurality of anode rods 44, for example three anode rods. The conveying pallets 41, thus loaded with the hot anode rods and spent anodes, are loaded for instance by means of a fork lift truck from the side, that is in the direction of arrow 45 in FIG. 3, onto the feed conveyor 29 i.e. roller track section forming the conveyor 29 and, after the door 15 at the inlet 13 of the chamber 5 has been opened, the pallets 41 are moved into the cooling chamber 5. The conveying pallets 41 thus pass onto the roller track of the main conveyor 21. As each loaded conveyor pallet 41 enters the chamber 5, the anode rods 44 carried on it strike the pivoting flap 20 with their upper ends, so that this flap pivots upwards towards the chamber and exposes the opening. In the downwardly pivoted position, the pivoting flap 20 closes the inlet cross-section of the cooling chamber in the upper region, so that no hot gases can escape from the cooling chamber 5. Immediately after the loaded conveying pallet 41 has entered the cooling chamber 5, the door 15 at the inlet end 13 is again closed. The conveying pallet 41 is then conveyed by the roller conveyor 21 at slow speed through the cooling chamber 5 in the direction of arrow 46 of FIG. 2. Each pallet 14 in succession together with the anode rods and spent anodes thereon is cooled by the fresh air flowing in through the ventilation duct 38 and, if applicable, through the air openings 40. The now heated fresh air, together with the gases given off from the spent anodes, is sucked out in the top region of the cooling chamber 5 through the air extraction pipes 6, 7 to the waste air duct 3. At the end of the cooling range, the anode rods together with spent anodes are cooled to the desired temperature. Each loaded conveying pallet 41 leaves the cooling chamber 5 at the cooling chamber outlet 14, after the roller shutter door 15 mounted here has been raised. The pallet 41 then passes from the through conveyor 21 and its roller track onto the pallet conveyor 34. At the end of the latter, the loaded conveying pallet 41 can be lifted by means of a fork lift truck sideways from the pallet conveyor 34 as indicated in FIG. 3 by the arrow 47.

It will be seen that the conveying pallets 41 loaded with the hot anode rods can pass in close succession through the cooling chamber 5. The support structure 23 for the roller conveyor 21 has, on each side, wall element projecting upwards beyond the plane of the conveying rollers 22. These wall elements form lateral guides 48 for the conveying pallets 41 carried on the roller track, as shown especially in FIG. 6.

On the side walls 8 and 9 of the cooling chamber 5, passages closed by doors 49 are provided, these doors 49 being equipped with special safety devices. In addition, larger maintenance openings are disposed on the lateral walls 8 and 9, which are closed by flaps or closure plates 50. Safety release cords 51 (FIG. 3) are conducted longitudinally through the cooling chamber 5 in the region of the access footways 28, which safety release cords serve for emergency operation and can, in such an emergency, actuate switches, which stop the through conveyor 21 and, possibly also, open the doors 15 of the cooling chamber 5.

The cooling apparatus described can be controlled automatically and/or from a control stand (FIG. 3). The roller shutter doors 15 are preferably opened and closed automatically. This can be achieved by means of light beam detector or the like.

As already mentioned, the cooling chamber 5 may be advantageously connected to the principal furnace extraction duct 3. It may, however, also be operated with its own air extraction system.

It should be understood that the above description is not intended to limit the invention and other modifications are possible within the scope of the appended claims.

I claim:

1. Apparatus for cooling anode rod assemblies, composed of spent anodes mounted on anode rods, removed from electrolytic furnaces; said apparatus comprising building structure defining an elongate cooling chamber, conveyor means for transporting the anode rod assemblies along the chamber and means for feeding cooling air into the chamber at least from a bottom region of the chamber and, means at the top region of the chamber for extracting heated together with any waste gases given off.

2. Apparatus according to claim 1, wherein the cooling. air feed means comprises a ventilation duct leading longitudinally through the chamber and provided with outlet openings for emitting fresh air, which are distributed along its length.

3. Apparatus according to claim 2, wherein the ventilation duct is disposed underneath the conveyor means.

4. Apparatus according to claim 2, wherein the ventilation duct is provided with upwardly directed pipes, constituting the fresh air outlet openings.

5. Apparatus according to claim 2, wherein the chamber has side walls and the cooling air feed means further comprises fresh air feed openings distributed along the length of the chamber in the chamber side walls.

6. Apparatus according to claim 5, wherein the openings in the chamber side walls are adjustable in their opening cross-section.

7. Apparatus according to claim 2, wherein the ventilation duct is in communication with the external atmosphere outside the cooling chamber.

8. Apparatus according to claim 1, wherein the air extraction means is connected to an air extraction system pertaining to the furnaces.

9. Apparatus according to claim 1, wherein the conveyor means comprises a track for conveying pallets carrying the anode rod assemblies.

10. Apparatus according to claim 9, wherein the track is constructed as a roller conveyor with driven conveying rollers.

11. Apparatus according to claim 10, wherein the roller conveyor has a support structure provided with upstanding components forming lateral guides for the conveying pallets.

12. Apparatus according to claim 10 wherein the air extraction means at least includes a ventilation duct disposed underneath the conveying rollers of the conveyor means and fresh air outlet openings or pipes directed generally onto the conveying rollers and their bearings.

13. Apparatus according to claim 9, wherein the conveying pallets are provided with upstanding anode rod holders which possess holding elements for holding the anode rods of the assemblies in an upright position on the conveying pallets.

14. Apparatus according to claim 1, wherein the cooling chamber is provided with a closable inlet and a closable outlet.

15. Apparatus according to claim 14, wherein the inlet and outlet of the chamber has closable doors in the form of vertically movable roller shutter doors with door drives.

16. Apparatus according to claim 1 wherein on at least one side of the conveyor means, there is a narrow access footway in the cooling chamber.

17. Apparatus according to claim 14 and further comprising a feed conveyor for passing pallets carrying the anode assemblies through the inlet of the cooling chamber to the conveyor means therein.

18. Apparatus according to claim 17, wherein the feed conveyor consists of a roller track disposed at the same level as the conveyor means.

19. Apparatus according to claim 14, wherein at the cooling chamber inlet and/or at the cooling chamber outlet there is a pivoting flap which can be pivoted upwards by being struck by the anode assemblies.

20. Apparatus according to claim 14, wherein the cross-section of the inlet and/or the outlet of the cooling chamber is narrowed down by a fixed wall to approximately a passage cross-section for the anode rod assemblies.

21. Apparatus according to claim 14 and further comprising conveyor track having buffer storage space for a plurality of pallets carrying the anode rod assemblies disposed at the outlet of the cooling chamber to receive the pallets from the conveyor means in the chamber.

22. Apparatus according to claims 1, wherein the chamber has side walls and closable maintenance and access openings are disposed in the side walls.

23. Apparatus according to claim 17, wherein the cooling chamber is disposed in the open air in the region of a closed furnace hall containing the furnaces, with the feed conveyor being disposed inside the furnace hall.

24. Apparatus according to claim 1, wherein at least one safety release cord is provided for actuating an emergency switch, the cord being disposed in the cooling chamber and extending therethrough.

25. Apparatus according to claim 1, wherein the cooling chamber has inner walls with radiant heat protection means.

* * * * *